June 11, 1940.  J. W. FULTON  2,204,353
RULE GAUGE
Filed Dec. 12, 1938
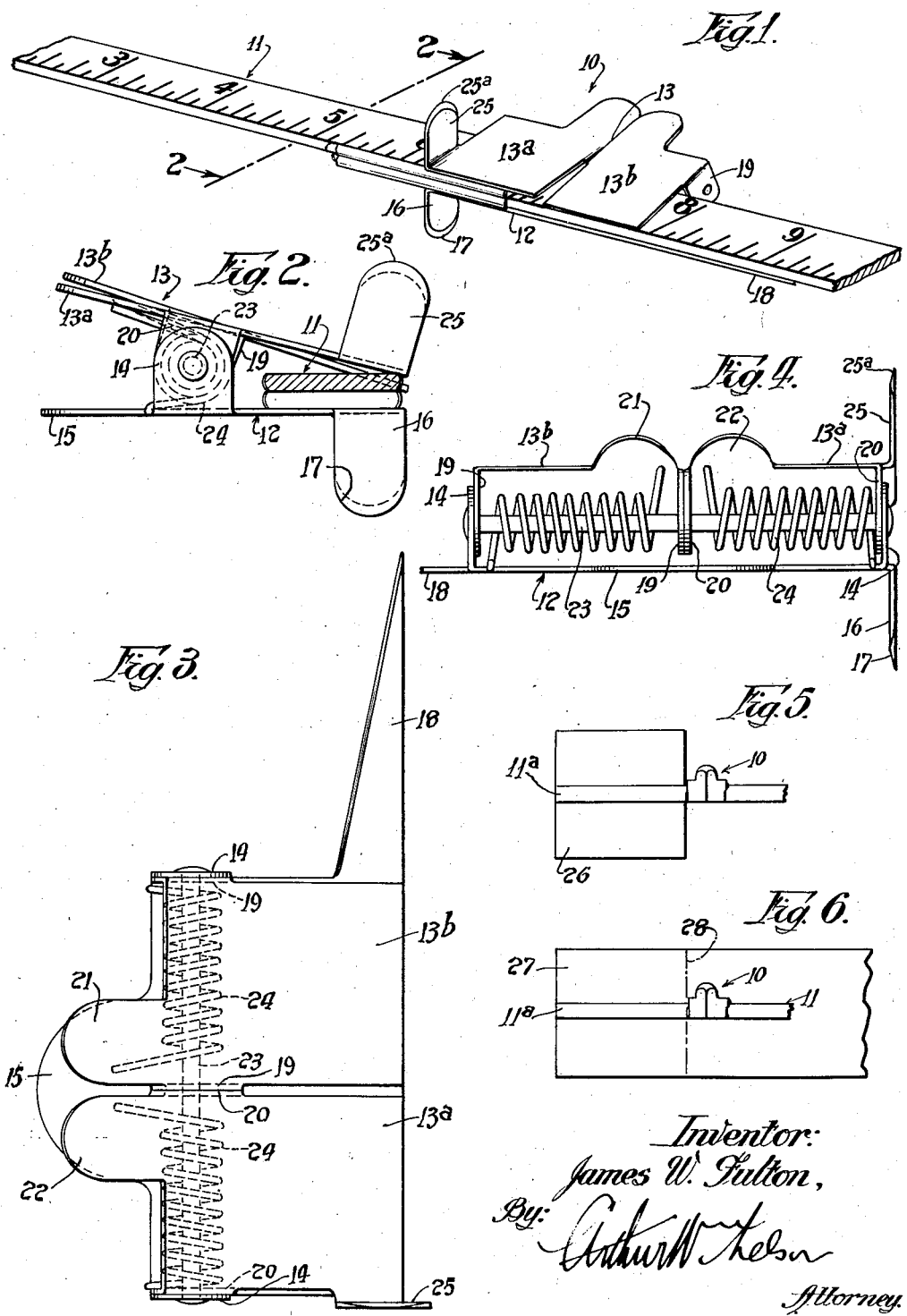
Inventor:
James W. Fulton,
By: Arthur W. Nelson
Attorney.

Patented June 11, 1940

2,204,353

UNITED STATES PATENT OFFICE 2,204,353

RULE GAUGE

James W. Fulton, Waukegan, Ill.

Application December 12, 1938, Serial No. 245,115

6 Claims. (Cl. 33—173)

This invention relates to improvements in rule gauges and it consists of the matters hereinafter described and more particularly pointed out in the appended claims.

Frequently a carpenter or other woodworker has to measure a certain length of a piece or article and then cut a similar length from longer stock. Ordinarily the carpenter would take a rule or scale, measure the length of the piece desired and then take the rule or scale and apply it to a piece of longer stock, making a mark with a pencil or scribing a line with a scriber, nail or other pointed article. When following this usual practice, there is always danger of error. There is the danger that the carpenter has not accurately read the rule or scale measurement in the first instance; there is the danger that he may forget the reading when applying it to the piece to be cut; and finally there is the danger when making the mark on the piece to be cut, even though he remembers the measurement taken, that his eye may not accurately place the marking implement directly at the point intended.

One of the objects of the present invention is to provide a small, simple and inexpensive device for attachment to a rule or scale or other elongated measuring member which overcomes the above mentioned chances of errors.

Another object of the invention is to provide a device in the nature of a spring clamp that engages flatly with a measuring member or rule of the folding kind when circumstance makes it necessary to apply the device to said member or rule at one of the folding joints thereof.

A further object of the invention is to provide a device of this kind including a shoulder or abutment having a scribing edge coincident with its outer face, whereby a measurement taken with the measuring member or rule with the aid of the device may be more accurately transferred and scribed upon another piece of work.

The above mentioned objects of the invention, as well as others, together with the advantages thereof, will more fully appear as the specification proceeds. The invention is herein illustrated and will be herein described as embodied in a device especially adapted for use in connection with the so-called "folding" measuring members or rule. This, however, is to be considered only in the illustrative sense and not by way of limitation because the device may also be used upon a one-piece rule or scale, a carpenter's rule or even an elongated member or blade such as an ordinary wooden lath.

In the drawing:

Fig. 1 is a perspective view showing a rule gauge embodying the preferred form of the invention when applied to a measuring device such as a so-called "folding" rule.

Fig. 2 is a transverse vertical sectional view through Fig. 1 as taken on the line 2—2 of said Fig. 1.

Fig. 3 is a top plan view of the rule gauge on a scale enlarged over that appearing in Fig. 1.

Fig. 4 is a view in rear elevation of the gauge device shown in Figs. 1, 2 and 3.

Fig. 5 is a diagrammatic view showing the manner of using the gauge in connection with a measuring device for taking the measurement of a certain piece of work.

Fig. 6 is a view similar to Fig. 5 and shows the manner of transferring the measurement taken in Fig. 5 to a stock of greater length to produce a duplicate of the piece of work appearing in Fig. 5.

Referring now in detail to that embodiment of the invention illustrated in Fig. 1 of the drawing: 10 indicates the device as a whole and 11 indicates a part of a relatively straight elongated measuring member such as a so-called folding rule upon which it is employed. When such a rule is in its extended position for use, end portions of adjacent sections overlap one another.

The improved device is generally in the nature of a spring clamp, including a bottom plate 12 and a top plate 13, the latter being made in the form of a pair of plate-like members 13a and 13b respectively arranged side by side.

The bottom plate 12 is formed at one side of its ends with upturned ears 14 and is further formed along said side centrally between said ears with a lateral finger grip extension 15. Said bottom plate is also formed at one end toward its other side with an upwardly extending shoulder or abutment 16, the free end of which is bevelled on its inner side or face to form a sharpened scribing edge 17 that is coincident with the outer face of said shoulder. If desired, but not necessarily so, said bottom plate may be formed at its other end, toward said other side, with a longitudinally disposed, pointed extension 18 to provide a scribing accessory for the device and which may be used as such when the device is removed from the member 11. As shown herein, the ears 14, extension 15, shoulder 16 and scribing extension 18 are all made as integral parts of the plate member 12.

Each plate-like member 13a—13b is of a width approximating that of the bottom plate 12 and is of a length approximating about half of that of said plate 12. Each plate-like member 13a—13b is also formed at one side of both of its ends with downturned pairs of ears 19 and 20 respectively. Each plate-like member is further formed along said sides with lateral grip extension portions 21 and 22 for combined or individual use in connection with the finger grip extension 15 of the bottom plate 12. The pairs of ears 19 and 20 respectively are adapted to align with each other and with the ears 14 of the plate 12 and when thus aligned, a pintle or pivot pin 23 is passed therethrough and whereby the plate members 13a—13b are mounted for independent pivotal movement on the bottom plate 12. Torsion springs 24—24 surround the pin 23 between the pairs of ears 19 and 20 of each plate member 13a—13b and one end of each spring has engagement with the plate 12 and the other end of each spring has engagement with an associated plate member 13a—13b.

By reason of the spring arrangement mentioned, those sides of the plate members 13a—13b opposite the grip portions 21—22 normally yieldingly engage that side of the plate 12 opposite the grip portion 15. If desired, the plate member 13a may be formed with an upturned abutment or shoulder 25 arranged in opposition to the shoulder 16 before mentioned, in which case the free edge of said shoulder 25 would likewise be bevelled on its inner side to form a sharpened scribing edge 25a that is coincident with the outer face of said shoulder. The outer faces of the shoulders 16 and 25 are arranged in the same plane and which plane may be coincident with or arranged outwardly from the plane occupied by the head on the associated end of the pin 23.

In applying the device to an elongated measuring member or a rule of any kind, the device is gripped in the fingers by the said extensions 15 and 21—22. These are then pressed toward each other so that the opposite sides of the plate 12 and the plate members 13a—13b open up or separate for application to said member or rule for one side edge thereof. When thus applied, the finger pressure on the extensions 15 and 21—22 is released, whereupon the plates 12 and 13a—13b clamp into engagement with opposite faces of said member or rule. When the device is applied to a folding rule and the measurement to be taken causes the device to engage the rule at a point where the adjacent sections thereof overlap, one of the plate members 13a—13b coacts with the plate 12 to clamp upon the two thicknesses of the overlapping rule sections and the other of said plate members coacts with the plate 12 to clamp upon the one thickness of the rule section they engage. This condition appears in Fig. 1. With such an arrangement it is to be noted that both plate members 13a—13b and the plate 12 have a relatively flat firm clamping engagement for a good tight grip on said member or rule whereby the device cannot accidentally shift or become askewed to provide an inaccurate transfer of the measurement taken.

In first applying the device to the elongated measuring member or rule, its position is approximated by the eye for a certain measurement. When taking the measurement, the device may be easily shifted along said member or rule by first exerting a pressure on the grip extensions 15 and 21—22 sufficient to loosen clamping engagement. When the device has been moved to bring the shoulders 16—25 into the desired measurement indicating position, the extensions 15 and 21—22 are released and the device clamps itself to said member or rule.

Referring now to Figs. 5 and 6 which show one manner of using the device. Assume that 26 represents a relatively short piece of board, of which a duplicate or similar sized piece is desired. To take the measurement of said piece of board the operator applies the device to the member employed for measuring, placing one end of said member in line with one end edge of said piece 26. The operator then slides the device along said member as above mentioned, until one of the abutments 16 or 24 comes into contact with the other end edge of said piece. Said member with the device clamped in position thereon is then removed from the piece 26 and placed on a board 27 from which the piece desired is to be cut. It is only necessary to place the end 11a of the member 11 in line with an end edge of the board 27 and then with the sharp edge of one or the other of the shoulders 16—25 make a line, scratch or other mark indicated by the dotted line 28 on said board in Fig. 6. This gives the workman a true line to be followed in cutting the board 27. As it has not been necessary for the workman to make any reading of the scale, there is no danger of the occurrence of the errors before mentioned. Furthermore, because it is not necessary to read scale or division marks, the workman can work under light conditions which would make it difficult if not impossible for him to work if scale reading were necessary as in prior practice.

The device is not only advantageous for those working in wood, but it is also advantageous to those working in metals and using steel scales and the like.

While in describing the invention I have referred in detail to the form, arrangement and construction of the parts of the device, the same is to be considered only in the illustrative sense so that I do not wish to be limited thereto except as may be specifically set forth in the appended claims.

I claim as my invention:

1. A gauge of the kind described embodying therein a pair of plate-like members adapted for engagement with opposite sides of an elongated blade member, one of said plate-like members comprising a plurality of plate-like parts, means providing a spring pressed, relatively hinged connection between said plate-like parts and the other of said plate-like members, and means carried by one of said plate-like members and arranged at a right angle to the length of the blade member and forming a gauge flange.

2. A gauge of the kind described embodying therein a pair of plate-like members adapted for engagement with opposite sides of an elongated blade member, one of said plate-like members comprising a plurality of plate-like parts, means providing a spring pressed, relatively hinged connection between said plate-like parts and the other of said plate-like members, and means carried by one of said plate-like parts and by the other of said plate-like members and arranged at a right angle to the length of the blade member and forming gauge flanges at opposite sides of the gauge.

3. A gauge adapted for use in connection with an elongated blade member and embodying therein top and bottom plate-like members adapted for detachable clamping engagement upon opposite sides of said blade member, one of said plate-like members comprising relatively movable plate-like parts adapted for relatively flat engagement with surface portions of one side of the blade member arranged in different planes.

4. A gauge adapted for use in connection with a rule having blade sections that overlap each other when said rule is in its extended condition, top and bottom plate-like members adapted for detachable clamping engagement upon opposite sides of said adjacent blade sections, one of said members comprising relatively movable parts for flat engagement with said overlapping parts of adjacent blade sections, and means on one of said plate-like members and forming a gauge flange extending transversely of the rule.

5. A gauge adapted for use in connection with an elongated blade member and embodying therein top and bottom clamping members adapted for clamping engagement upon opposite sides of said blade member, one of said clamping members comprising plate-like parts arranged side by side and each including spaced apart ears and the other clamping member including spaced apart ears, means pivotally connecting the ears of said plate-like parts of the first mentioned clamping member to the ears of said other clamping member, and spring means between each plate-like part and said other clamping member and operating normally to urge certain edge portions of said plate-like parts toward an associated parallel edge portion of said other clamping member, one of said clamping members carrying a shoulder part at one end thereof.

6. A gauge adapted for use in connection with an elongated blade member and embodying therein top and bottom clamping members adapted for clamping engagement upon opposite sides of said blade member, one of said clamping members embodying plate-like parts arranged side by side and each including spaced apart ears and the other clamping member including spaced apart ears, means pivotally connecting the ears of said plate-like parts of the first mentioned clamping member to the ears of said other clamping member and operating normally to urge certain edge portions of said plate-like parts parallel with and to one side of the axis of said pivotally connecting means into engagement with an associated edge portion of said other clamping member and one of which clamping members carries a shoulder part at one end thereof, and means providing extensions for said plate-like parts and for said other clamping member on the other side of said axis.

JAMES W. FULTON.